United States Patent
Shi et al.

(10) Patent No.: US 8,280,705 B2
(45) Date of Patent: Oct. 2, 2012

(54) METHOD AND DEVICE FOR PREDICTING RESIDUAL ONLINE TIME OF PEER IN PEER-TO-PEER NETWORK

(75) Inventors: Guangyu Shi, Shenzhen (CN); Hao Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 12/835,400

(22) Filed: Jul. 13, 2010

(65) Prior Publication Data
US 2010/0280804 A1 Nov. 4, 2010

Related U.S. Application Data

(63) Continuation of application No. PCT/CN2008/072778, filed on Oct. 22, 2008.

(30) Foreign Application Priority Data

Jan. 23, 2008 (CN) .......................... 2008 1 0065629

(51) Int. Cl.
G06F 7/60 (2006.01)
G06F 9/45 (2006.01)
(52) U.S. Cl. ............................................. 703/2; 703/22
(58) Field of Classification Search ................. 703/2, 22
See application file for complete search history.

(56) References Cited

U.S. PATENT DOCUMENTS

| | | | |
|---|---|---|---|
| 6,847,854 B2 * | 1/2005 | Discenzo | 700/99 |
| 2006/0247798 A1 * | 11/2006 | Subbu et al. | 700/44 |
| 2007/0061232 A1 | 3/2007 | Bonissone et al. | |

FOREIGN PATENT DOCUMENTS

| | | |
|---|---|---|
| CN | 1972206 A | 5/2007 |
| CN | 101043525 A | 9/2007 |

OTHER PUBLICATIONS

"Predicting Internet Distance with Coordinates-Based Approaches", Ng, et al. 2002 IEEE.*
"P2P-Paid: A Peer-to-Peer Wireless Payment System", Gao, et al. 2005.*
"Experimental analysis of the impact of peer-to-peer applications on traffic in commercial IP networks", Azzouna et al. European Transactions on Telecommunications. 2004.*
Written Opinion of the International Searching Authority dated Jan. 22, 2009 in connection with International Patent Application No. PCT/CN2008/072778.
International Search Report dated Jan. 22, 2009 in connection with International Patent Application No. PCT/CN2008/072778.
Jiang, Shouxu, et al., "Evaluation of Behavior of Peers in Peer-to-Peer File Sharing Systems", Journal of Harbin University of Commerce (Natural Sciences Edition), Dec. 2005, vol. 21, No. 6, p. 731-735.

* cited by examiner

Primary Examiner — Kandasamy Thangavelu
Assistant Examiner — Nithya Janakiraman

(57) ABSTRACT

A method for predicting a residual online time of a peer in a peer-to-peer (P2P) network is provided. The method includes: obtaining M history life cycle sampling data $S_i$ of a peer, i=1, . . . , M; determining the number, n, of Gaussian components in a multidimensional Gaussian Mixture Model to be established, where n≧2, and the multidimensional Gaussian Mixture Model denotes a probability distribution of a residual online time of the peer; using $S_i$ and n to establish the multidimensional Gaussian Mixture Model; and using the established multidimensional Gaussian Mixture Model to predict the residual online time of the peer. A device for predicting a residual online time of a peer in a P2P network is also provided.

5 Claims, 4 Drawing Sheets

METHOD AND DEVICE FOR PREDICTING RESIDUAL ONLINE TIME OF PEER IN PEER-TO-PEER NETWORK

CROSS-REFERENCE TO RELATED APPLICATIONS

This application is a continuation of International Application No. PCT/CN2008/072778, filed on Oct. 22, 2008, which claims priority to Chinese Patent Application No. 200810065629.9, filed on Jan. 23, 2008, both of which are hereby incorporated by reference in their entireties.

TECHNICAL FIELD

The present invention relates to the field of Peer-to-Peer (P2P) network technology, and more particularly to a method and a device for predicting a residual online time of a peer in a P2P network.

BACKGROUND

Different from a conventional client/server mode, a P2P network does not have a central server node, and each node in the P2P network can not only serve as a server for providing services for other nodes, but also can receive services provided by other nodes that serve as servers. Thus, in the P2P network, each peer node is in an equivalent position, that is, each node is refereed to as an equivalent, or a peer.

During the implementation of the present invention, the inventor(s) found that, the prior art at least has the following problems The P2P network is a self-organized configuration network system. In the network, the behavior of joining the network or exiting the network performed by each peer is random. In the P2P network, each peer serves as a server for providing services for other peers, so that the random feature of the peers when joining or exiting the system may disturb the data transmission between nodes. For example, if another peer is connected to the current peer before the current peer gets offline and gets ready to download data from the current peer, but the current peer suddenly goes offline, on the one hand, the peer cannot serve as a server for providing the service for said another peer, and on the other hand, said another peer has to re-route to still another peer to obtain relevant data. The random feature of the online behavior of the peers may influence the normal operation of the network system, and may deteriorate the performance of the whole system. The influence caused by the random feature of the online behavior of the peers on the P2P network system is called a churn phenomenon.

Accordingly, corresponding measures need to be taken, so as to avoid as much as possible the negative effects on the system caused by the churn phenomenon, thereby enhancing the churn resistant capability of the P2P network.

SUMMARY

Accordingly, the present invention is directed to a method and a device for predicting a residual online time of a peer in a P2P network, which is capable of predicting the residual online time.

An embodiment of the present invention provides a method for predicting a residual online time of a peer in a P2P network. The method includes the following steps.

M history life cycle sampling data $S_i$ of a peer is obtained, where i=1, ..., M.

The number n of Gaussian components in a multidimensional Gaussian Mixture Model to be established is determined, where n is a positive integer greater than or equal to 2; and the multidimensional Gaussian Mixture Model denotes a probability distribution of the residual online time of the peer.

$S_i$ and n are utilized to establish the multidimensional Gaussian Mixture Model.

The established multidimensional Gaussian Mixture Model is utilized to predict the residual online time of the peer.

In an embodiment, the present invention provides a device for predicting a residual online time of a peer in a P2P network. The device includes an obtaining unit, a model establishing unit, and a predicting unit.

The obtaining unit is configured to obtain M history life cycle sampling data $S_i$ of a peer, where i=1, ..., $M_i$.

The model establishing unit is configured to utilize $S_i$ obtained by the obtaining unit and the number, n, of Gaussian components to establish a multidimensional Gaussian Mixture Model, where n is a positive integer greater than or equal to 2, and the Gaussian hybrid model denotes a probability distribution of the residual online time of the peer.

The predicting unit is configured to utilize the multidimensional Gaussian Mixture Model established by the model establishing unit to predict the residual online time of the peer.

In an embodiment, the present invention provides a method for establishing a life cycle model of a peer in a P2P network. The method includes the following steps.

M history life cycle sampling data $S_i$ of a peer is obtained, where i=1, ..., M.

The number, n, of Gaussian components in a multidimensional Gaussian Mixture Model to be established is determined, where n is a positive integer greater than or equal to 2, and the multidimensional Gaussian Mixture Model denotes a probability distribution of a residual online time of the peer.

$S_i$ and n are utilized to establish the multidimensional Gaussian Mixture Model.

Description information of the Gaussian hybrid model is sent.

An embodiment of the present invention provides a device for establishing a life cycle model of a peer in a P2P network. The device includes an obtaining unit, a model establishing unit, and a sending unit.

The obtaining unit is configured to obtain M history life cycle sampling data $S_i$ of a peer, where i=1, ..., $M_i$.

The model establishing unit is configured to utilize $S_i$ obtained by the obtaining unit and the number, n, of Gaussian components to establish a multidimensional Gaussian Mixture Model, where n is a positive integer greater than or equal to 2, and the Gaussian hybrid model denotes a probability distribution of a residual online time of the peer.

The sending unit is configured to send description information of the Gaussian hybrid model established by the model establishing unit.

Compared with the prior art, embodiments of the present invention have the following merits.

With the method and the device for predicting the residual online time of the peer in the P2P network according to embodiments of the present invention, the history life cycle sampling data is utilized to establish the multidimensional Gaussian Mixture Model for denoting the probability distribution of the residual online time of the peer, and the residual online time of the peer is predicted based on the multidimensional Gaussian Mixture Model.

DETAILED DESCRIPTION OF THE EMBODIMENTS

The following detailed description is directed to the technical solution of the present invention with reference to the accompanying drawings. However, the embodiments to be described are only part of, rather than all of, the embodiments of the present invention. Additionally, all other embodiments, which can be derived by those skilled in the art from the embodiments given herein without any creative efforts, fall within the scope of the present invention.

The technical solution of the embodiments of the invention will be described in detail with reference to the accompanying drawings.

The reason why it is difficult for the life cycle prediction result of an existing peer to represent an actual life cycle of the peer is that merely the influences, caused by $\Delta t_{alive}$ and $\Delta t_{since}$ when the peer is online, on the prediction result are considered when the prior art adopts a power law distribution model to predict the life cycle, that is, merely the influences caused by the current online state of the peer on the prediction result are denoted. However, the online state is not essentially an importation factor for influencing the life cycle of the peer. Actually, a user usually shows a certain user habit when surfing the Internet. For example, users generally get online from nine o'clock to ten o'clock in the morning, and generally get online from 20 o'clock to 22 o'clock in the evening. Thus, the history online time of a peer shall be taken as an important factor for influencing the life cycle prediction result of the peer, and shall be used for predicting the life cycle of the peer.

Furthermore, in the prior art, the residual online time of the peer is predicted based on a probability distribution followed by a single factor of a current elapsed online time, which lacks in comprehensive consideration about various possible factors that actually influence the accuracy of the prediction result. Thus, the prediction result greatly deviates from the actual result. The actual history life cycles are generated under the influences of various possible factors. Thus, in the embodiments of the present invention, the life cycle regularity of the peer is calculated statistically according to the online data (for example, online time point, online time) of the history life cycle samples, and then the current life cycle probability and the possible residual lifetime of the peer are predicted according to the life cycle regularity of the peer.

In the embodiments of the present invention, a multidimensional Gaussian Mixture Model is utilized to describe probability distribution of a life cycle of the peer, and a residual online time of the peer is derived based on the established multidimensional Gaussian Mixture Model, and then the life cycle of the peer is derived further in combination with the elapsed online time of the peer.

Figure 1:
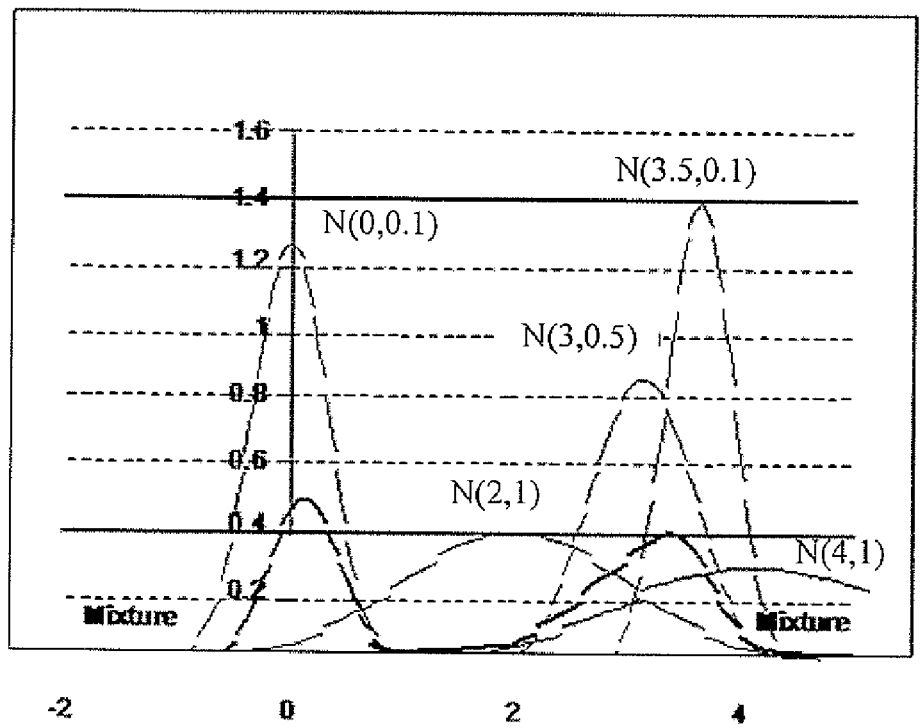
FIG. 1 is a schematic view of a Gaussian hybrid model.

First, the Gaussian hybrid model is briefly described as follows. The Gaussian hybrid model is a probability distribution model for combining a plurality of Gaussian distributions based on a plurality of Gaussian components following Gaussian distributions and a weight corresponding to each Gaussian component. FIG. 1 is a schematic view of a Gaussian hybrid model. Referring to FIG. 1, the model has 5 Gaussian components, each Gaussian component follows a corresponding Gaussian distribution, and each Gaussian distribution is marked by a corresponding Gaussian curve. The Gaussian distribution function corresponding to the Gaussian curve is, for example, represented by Equation (3):

$$p(x) = \frac{1}{\sqrt{2\pi}\,\sigma} \exp\left(-\frac{1}{2}\left(\frac{x-\mu}{\sigma}\right)^2\right) \quad \text{Equation (3)}$$

Generally, for simplicity, $N(\mu,\sigma^2)$ represents a Gaussian distribution, where $\mu$ is a mean value of x, and $\sigma^2$ is a square of the variance of x and the mean value. As for the establishment of one Gaussian model, as long as $\mu$ and $\sigma^2$ are known, the Gaussian model can be established. In the model shown in FIG. 1, five Gaussian distributions are respectively N (0, 0.1), N (2, 1), N (3, 0.5), N (3.5, 0.1), and N (4, 1). When the five Gaussian distributions are combined, the weights of the Gaussian components in terms of influencing the combination results are different, so that the five Gaussian distributions are fit into one mixed Gaussian curve Mixture, as shown in FIG. 1.

The Gaussian distribution function corresponding to the two-dimensional Gaussian curve is shown in Equation (4):

$$f(x) = \frac{1}{2\pi\sigma_x\sigma_y\sqrt{1-r^2}} \exp\left\{-\frac{1}{2(1-r^2)}\left[\left(\frac{x-\mu_x}{\sigma_x}\right)^2 - 2r\left(\frac{x-\mu_x}{\sigma_x}\right)\left(\frac{y-\mu_y}{\sigma_y}\right) + \left(\frac{y-\mu_y}{\sigma_y}\right)^2\right]\right\} \quad \text{Equation (4)}$$

In the function, N multi-unit arrays are utilized to represent $(\mu_x,\sigma_x,\mu_y,\sigma_y,r)$, where j=1, 2, ... N, and r denotes a correlation coefficient between the two-dimensional Gaussian components, and $|r|<1$. In the present invention, the mean value of bivariate Gaussian distribution random variables $\xi$ and $\eta$ is listed as follows:

$$E\begin{pmatrix}\xi\\\eta\end{pmatrix} = \begin{pmatrix}\mu_x\\\mu_y\end{pmatrix} = \mu.$$

The covariance matrix is that:

$$B = \begin{pmatrix} \sigma_x^2 & r\sigma_x\sigma_y \\ r\sigma_x\sigma_y & \sigma_y^2 \end{pmatrix}.$$

The two-dimensional Gaussian distribution may be represented as N(μ, B).

Similarly, the d-dimensional Gaussian distribution function is shown in Equation (5):

$$f(x) = \frac{1}{(2\pi)^{d/2}|\Sigma|^{1/2}} \exp\left\{-\frac{1}{2}\left[(x-\mu)^T \Sigma^{-1} (x-\mu)\right]\right\}. \quad \text{Equation (5)}$$

Figure 2:
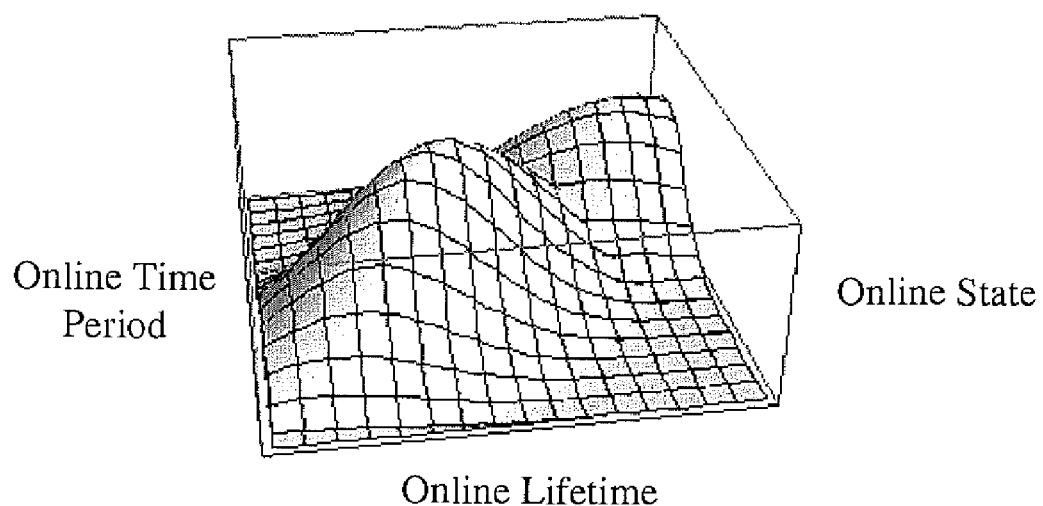
FIG. 2 is a schematic view of a three-dimensional Gaussian hybrid model.

Finally, the three-dimensional Gaussian hybrid model constructed by the life cycle history records of M nodes is shown in FIG. 2, and the circumstance that a plurality of peak values overlaps together may occur within a certain statistic time period.

In the embodiment of the present invention, the residual online time of the peer is predicted by establishing a multidimensional Gaussian Mixture Model.

Figure 3:
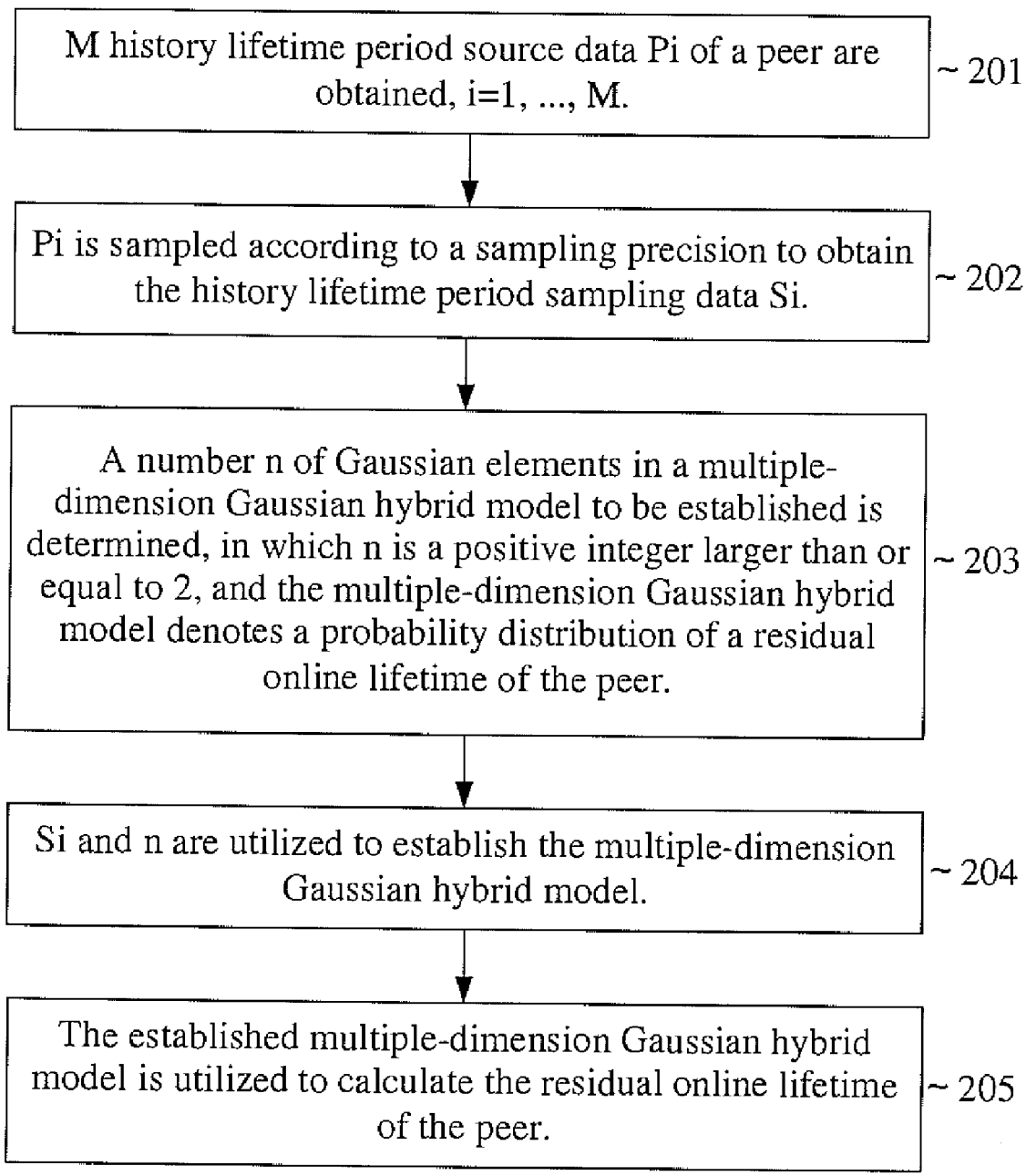
FIG. 3 is a flow chart of a method for predicting a life cycle of a peer according to an embodiment of the present invention.

FIG. 3 is a flow chart of a method for predicting a life cycle of a peer according to an embodiment of the present invention. Referring to FIG. 3, the method includes the following steps.

In step 201, M history life cycle source data Pi of a peer are obtained, where i=1, ..., M, and history life cycle sampling data may include a history starting online time point and a history online time of a peer node.

The M history life cycle source data Pi of the peer may be obtained first, where i=1, ..., M. The source data Pi may include an online time point and an online time of the peer node each time when the peer node gets online (for example, a node A gets online at 20 o'clock on January 4 and stays online for an online time of 2 hours; and gets online at 10:20 on January 5 and stays online for an online time of 3 hours, and the like).

In the embodiment of the present invention, in order to protect users' privacy, the history life cycle sampling data may be recorded and stored by the peer itself. Meanwhile, the history life cycle sampling data may be obtained concentratedly by enabling the peer node to send the history life cycle sampling data to a certain central server.

In step 202, Pi is sampled according to a sampling precision to obtain the history life cycle sampling data $S_i$. The $S_i$ may include a history starting online time point and a history online time of the peer node, where the history online time data of the peer node may include a total time length from a certain time point when a node gets online to a time point when the node gets offline. The history online time may be measured in the following units, for example measured in minutes, in seconds, or in hours, and the smaller the unit is, the more accurate the data will be.

In addition, step 20 may be adopted to replace step 201 and step 202, and in step 20, the peer node is directly sampled to obtain the sampling data $S_i$ of the peer.

In the embodiment of the present invention, in order to protect the users' privacy, the history life cycle source data may be recorded and stored by the peer itself. Meanwhile, the history life cycle source data may be obtained concentratedly by enabling the peer node to send the history life cycle source data to a certain central server.

In step 203, the number, n, of Gaussian components in a multidimensional Gaussian Mixture Model to be established is determined, where n is a positive integer greater than or equal to 2, and the multidimensional Gaussian Mixture Model denotes a probability distribution of a residual online time of the peer.

In actual applications, the value of n may be determined by comprehensively considering the approaching extend between the established multidimensional Gaussian Mixture Model and an actual probability distribution of the life cycle and the amount of calculations required during the establishment of the multidimensional Gaussian Mixture Model. Generally, the greater the value of n is, the larger the amount of calculations is required during the establishment of the model, but the closer the established multidimensional Gaussian Mixture Model approaches the actual probability distribution.

No sequential order is specified between step 203 and steps 201 and 202, that is, steps 201 and 202 may be performed first before step 203 is performed; alternatively, step 203 may also be performed first before steps 201 and 202 are performed.

In step 204, $S_i$ and n are utilized to establish the multidimensional Gaussian Mixture Model.

In this step, the process of establishing the multidimensional Gaussian Mixture Model is a process of calculating Gaussian distribution parameters μ and B corresponding to each Gaussian component and a weight of each Gaussian component in the multidimensional Gaussian Mixture Model. In the embodiment of the present invention, μ and B are selected as multiple-dimension Gaussian distribution parameters.

After the multidimensional Gaussian Mixture Model is established, the multidimensional Gaussian Mixture Model may be sent. For example, the model is established by a server, and then the model is sent to a peer for application, or the model is established by a peer and then the model is sent to a server for application. When the multidimensional Gaussian Mixture Model is sent, description information of the Gaussian hybrid model may be sent, where the so-called description information of the Gaussian hybrid model is the above hybrid model parameters, for example, w, μ, and B.

In step 205, the established multidimensional Gaussian Mixture Model is utilized to calculate the residual online time of the peer.

Those skilled in the art may understand that all or a part of the steps of the method according to the embodiments of the present invention may be implemented by a program instructing relevant hardware. The program may be stored in a computer readable storage medium, such as a Read-Only Memory (ROM), a Random Access Memory (RAM), a magnetic disk, or a Compact Disk Read-Only Memory (CD-ROM).

A current surviving life cycle of the peer is predicted based on the calculated residual online time of the peer and the current elapsed online time of the peer. Furthermore, the P2P network system may make preparations for the getting offline of the peer based on the predicted value of the online time of the peer, for example, the P2P network system may notify in advance other associated neighboring nodes to refresh the maintained node information, so as to effectively avoid the phenomenon that the node gets offline at the moment when the other associated neighboring nodes point to the node in the searching or routing process, prevent the churn phenomenon on the network system caused by the random feature of the getting offline of the peer, and enhance the churn resistant capability of the network system. The system notifies other associated neighboring nodes of, for example, a node identifier (ID) of the node included in a pointer table in a chord network, or an ID of the node included in a routing table in the pastry network, or an ID of the node included in a K-bucket in the kademlia network, or the like.

How to establish the Gaussian hybrid model in step 204 is further described below.

Figure 4:
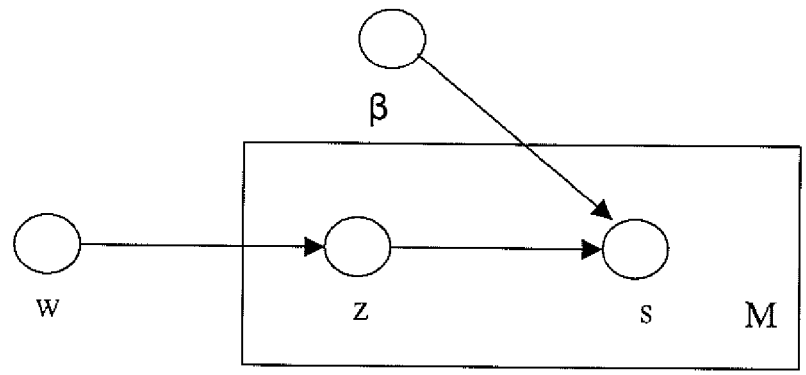
FIG. 4 is a schematic view of an algorithm of a multidimensional Gaussian Mixture Model according to an embodiment of the present invention.
Figure 5:
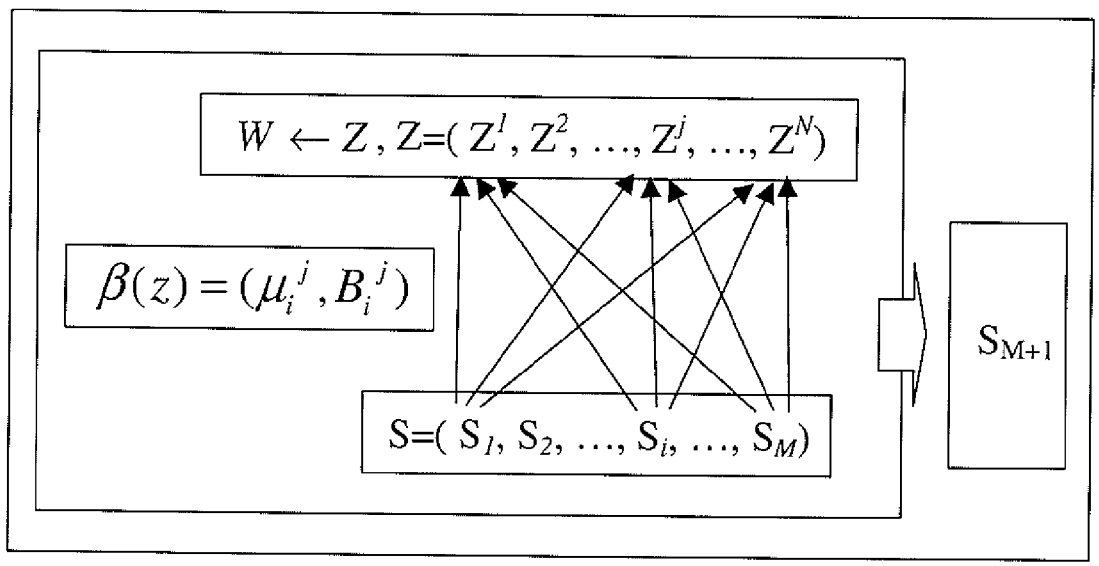
FIG. 5 is a schematic view of a calculating process of a multidimensional Gaussian Mixture Model according to an embodiment of the present invention.

FIG. 4 is a schematic view of an algorithm of a Gaussian hybrid model according to an embodiment of the present invention. FIG. 5 is a schematic view of a calculating process of a Gaussian hybrid model according to an embodiment of the present invention. In FIGS. 4 and 5, S represents a sequence of history life cycle sampling data, M represents M sampling data in a sampling data space, β represents n Gaussian distributions, w represents weights of Gaussian components, and Z follows a Gaussian distribution with a parameter of β.

$$S=(S_1, S_2, S_i, \ldots, S_M);$$

$$\beta_j = N(\mu_j, B_j), j=1, \ldots, n;$$

$$\zeta_i \sim \text{Multinomial}(w).$$

Based on the sampled M $S_i$, the occurring times of each $S_i$ in M can be known, thereby further calculating an occurring probability $s_i$ of each $S_i$. The probability distribution corresponding to $s_i$ is set as $p(s_i|\zeta_i, \beta)$, and the probability distribution represents a Gaussian hybrid model that needs to be established corresponding to the actual probability distribution.

In the specific calculation, according to the known variables $s_i$ and n, based on the existing Bayesian inference, the Gaussian distribution parameters of each multiple dimension Gaussian model in the multidimensional Gaussian Mixture Model are calculated, that is, $\beta_j = N(\mu_j, B_j)$, and corresponding w. The $\beta_j = N(\mu_j, B_j)$ that needs to be solved and the corresponding w are called hybrid model parameters. Based on the known variables $s_i$ and n, w and β can be estimated through a maximum-likelihood method, and the specific process is described as follows, where initial values of w and β are set as 0.

In the first step, a likelihood function including multiple dimension hybrid model parameters is established:

$$L(s; \theta), L(s; \theta) = \prod_{i=1}^{M} p(s_i | \theta), \theta = (w_j, \mu_j, B_j);$$

In the second step, an estimated value of each of the hybrid model parameters when $L(s; \theta)$ reaches a maximum value is calculated according to $s_i$. The likelihood function $L(s; \theta)$ the logarithm $\ln L(s; \theta)$ of the likelihood function achieve the maximum value at the same parameter θ. Thus, for the simplicity of calculation, the estimation is generally realized by calculating the logarithm of the likelihood function:

$$\ln L(s; \theta) = \sum_{i=1}^{M} \ln \left( \sum_{j=1}^{N} w_{ij} N_{s_i}(\mu_j, B_j) \right), \quad \text{Equation 1}$$

In Equation 1, $w_{ij} = p(w_i = j|\theta)$, and $$\sum_{j=1}^{N} p(w_i = j|\theta) = 1.$$

The expectation-maximization (EM) algorithm estimation is adopted for Equation 1.

In step E, a posterior probability of the parameter w is calculated according to the estimated value $\theta^{(k)} = (w^{(k)}, \mu^{(k)}, B^{(k)})$ obtained from the previous step M, where the derivation process is shown as follows:

$$h_{ij}^{(k)} = p(w_i = j | s_i, \theta^{(k)}) = \frac{p(w_i = j, s_i | \theta^{(k)})}{p(s_i | \theta^{(k)})}$$

Since $p(s|w=j, \theta) = N(\mu_j, B_j)$, the above equation is transformed into:

$$h_{ij}^{(k)} = \frac{p(s_i | w_i = j, \theta^{(k)}) p(w_i = j | \theta^{(k)})}{\sum_{l=1}^{N} p(s_i | w_i = l, \theta^{(k)}) p(w_i = l | \theta^{(k)})} = \frac{w_{ij}^{(k)} N_{s_i}(\mu_j^{(k)}, B_j^{(k)})}{\sum_{l=1}^{N} w_{il}^{(k)} N_{s_i}(\mu_l^{(k)}, B_l^{(k)})}.$$

In step M, an expectation function is generated by adopting the expectation-maximization algorithm, and then a parameter θ that enables the expectation function to achieve a maximum value is obtained. The maximum value may be obtained by calculating a derivative of the likelihood function and making the result be equal to 0, and then calculating θ. That is to say, $$\frac{\partial L(\theta)}{\partial \theta} = 0.$$

In the process of calculating the derivative of the likelihood function in step M, the derivative of the parameter $\theta = (\mu, B, p(w=j))$ may be calculated once.

By means of solving $$\frac{\partial L(\theta)}{\partial \mu_j} = 0, \mu_j^{(k+1)} = \frac{\sum_{i=1}^{M} h_{ij}^{(k)} s_i}{\sum_{i=1}^{M} h_{ij}^{(k)}}$$

is obtained.
By means of solving $$\frac{\partial L(\theta)}{\partial B_j} = 0, B_j^{(k+1)} = \frac{\sum_{i=1}^{M} h_{ij}^{(k)} (s_i - \mu_j^{(k)})(s_i - \mu_j^{(k)})^T}{\sum_{i=1}^{M} h_{ij}^{(k)}}$$

is obtained.
By means of solving $$\frac{\partial L(\theta)}{\partial p(w_i = j|\theta)} = 0, w_{ij}^{(k+1)} = \frac{1}{M} \sum_{i=1}^{M} h_{ij}^{(k)}$$

is obtained.

After the parameter θ is calculated according to the above calculating process, the hybrid model parameters are determined. Correspondingly, the Gaussian hybrid model is determined as well. The above estimation of the hybrid model parameters is based on the EM algorithm, and in the actual applications, the hybrid model parameter may be estimated by using Calculus of Variation.

Then, the calculated hybrid model parameters are stored, and the Peer may predict the residual online time of the peer by using the established Gaussian hybrid model, that is, estimate $S_{M+1}$, where the specific process is described as follows.

In step a, according to the stored hybrid model parameters, an occurring probability density of the life cycle of the peer is calculated:

$$p(s_i) = \sum_{j=1}^{N} w_{ij} N(\mu_j, B_j).$$

In step b, a probability of the residual surviving lifetime y of the peer is set as Q(y), and through, $Q(y)=p(s>(t+y)|s>t,\delta)$, the following equation is obtained:

$$Q(y) = p(s > (t + y) | s > t, \delta) \qquad \text{Equation 2}$$
$$= \frac{p(s > (t + y) | \delta)}{p(s > t | \delta)}$$
$$= \frac{p(s > (t + y) \cap \delta)}{p(s > t \cap \delta)}$$
$$= \frac{\int_{t+y}^{\infty} p(s) ds}{\int_{t}^{\infty} p(s) ds}$$

In the above equation, $t=\Delta t_{alive}$ is a set value, $y=\Delta t_{since}$ is a variable, and $\delta$ is a current online time interval value. The denominator is a certain constant value, and the numerator is an expression of y.

In step c, an expectation value E[y] of the residual online time of the peer is calculated, that is, $E(y)=\int yQ(y)dy$.

In step d, the life cycle T of the peer is predicted based on the predicted residual online time:

$$T=t+E[y]=t+\int yQ(y)dy.$$

Till now, the life cycle of the peer is predicted based on the established multidimensional Gaussian Mixture Model.

The contents of $s_i$ may include interval information, where the interval represents a sampling time period, and the length of the interval may be one hour, one day, half day, one week, or one month. Alternatively, Monday, Tuesday, Wednesday, Thursday, Friday, Saturday, or Sunday is taken as an interval, or Monday to Friday is taken as one interval, and Saturday to Sunday is taken as one interval, and the like. The intervals may be classified into various types, and a plurality of sampling data belonging to the same interval may be calculated statistically, so as to obtain an online regularity in the interval, which is taken as one input dimension of the Gaussian model and is added into the calculations of the model parameters.

In addition, a Gaussian model may be established for each interval. In one week, Monday, Tuesday, Wednesday, Thursday, Friday, Saturday, or Sunday may be respectively taken as one interval, so that 7 Gaussian models need to be established to calculate the online regularity in each interval statistically. In one week, Monday to Friday may be taken as one interval and Saturday to Sunday may be taken as one interval, so that 2 Gaussian models need to be established to calculate the online regularity in each interval statistically.

Each interval may be divided into scales according to a sampling precision, and every 15 minutes may be divided into one scale, or every half an hour may be divided into one scale, and the like. The online regularity in the interval may be obtained by calculating the online information in each scale (for example, whether the peer gets online, online time).

The contents of $S_i$ may include: online time information and online time point information. In this way, the established hybrid Gaussian model has three dimensions, including online time, online time point, and a probability distribution. If the information from a plurality of intervals is collected together, one dimension is added, that is, a dimension formed by the plurality of intervals. Thus, the contents of $S_i$ may include: online time information, online time point information, and online interval information. In this case, the established hybrid Gaussian model has four dimensions, including: online time, online time point, online interval, and probability distribution.

If the probability within one week is calculated statistically, Monday to Sunday may be taken as one interval, and the contents of $S_i$ include two dimensions, that is, online time and online time point. Alternatively, one week may be classified into several intervals (for example, Monday, Tuesday, Wednesday, Thursday, Friday, Saturday, or Sunday is respectively taken as one interval), and in this case, the contents of $S_i$ include three dimensions, that is, online time, online time point, and online interval.

The contents of $S_i$ are demonstrated through the following examples:

{online time(min), online time point(hour:minute), online interval(week)}={120,20:15,5}, {240,14:00,6} . . . {50,21:30,1} or

{online time(min), online time point(hour:minute), online interval(week)}={120,20:15, Weekends}, {240,14:00, Weekends} . . . {50,21:30, Working days} or

{online time(min), online time point(week:hour:minute)}={120,5:20:15}, {240,6:14:00} . . . {50,1:21:30}

Figure 6:
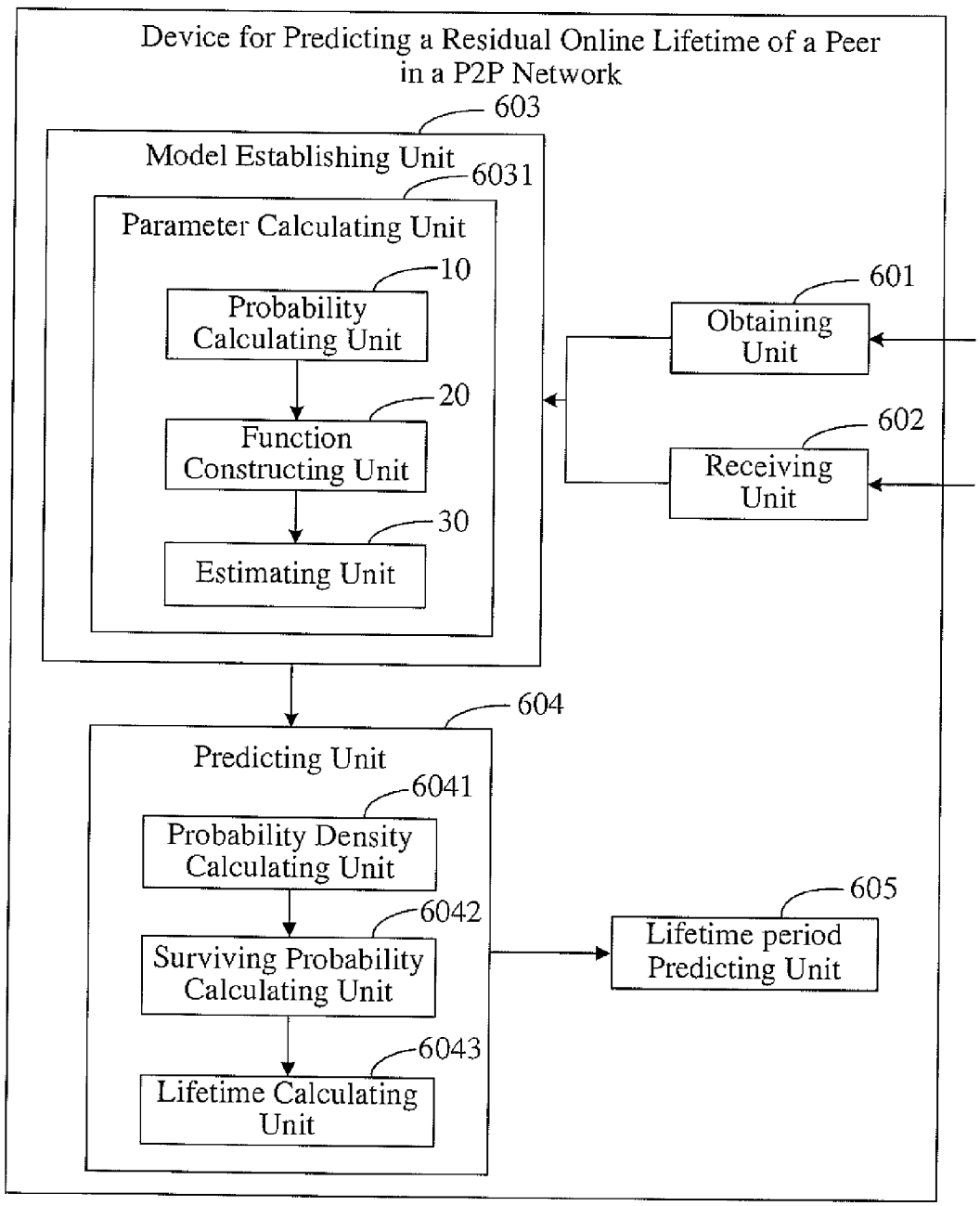
FIG. 6 shows a device for predicting a residual online time of a peer in a P2P network according to an embodiment of the present invention.

Corresponding to the solution of predicting the residual online time of the peer in the above embodiment of the present invention, in an embodiment, the present invention further provides a device for predicting a residual online time of a peer in a P2P network. The device is realized based on the above-described method. FIG. 6 is a schematic structural view of the device. Referring to FIG. 6, the device may be disposed on each peer or server or other communication device, and configured to predict a residual online time of the peer each time when the peer gets online. The device includes an obtaining unit 601, a receiving unit 602, a model establishing unit 603, and a predicting unit 604.

The obtaining unit 601 is configured to obtain M history life cycle sampling data $S_i$ of a peer, where i=1, . . . , M.

The obtaining unit 601 may further include a first unit and a second unit.

The first unit is configured to obtain M history life cycle source data Pi of the peer, where i=1, . . . , M.

The second unit is configured to sample the history life cycle source data Pi according to a sampling precision, so as to obtain $S_i$.

The receiving unit 602 is configured to receive the number, n, of Gaussian components in a multidimensional Gaussian Mixture Model to be established, where n is a positive integer greater than or equal to 2; and the multidimensional Gaussian Mixture Model denotes a probability distribution of the residual online time of the peer.

The model establishing unit 603 is configured to utilize $S_i$ obtained by the obtaining unit and the number, n, of Gaussian components to establish the multidimensional Gaussian Mixture Model, where n is a positive integer greater than or equal to 2; and the Gaussian hybrid model denotes the probability distribution of the residual online time of the peer.

The predicting unit 604 is configured to utilize the multidimensional Gaussian Mixture Model established by the model establishing unit to predict the residual online time of the peer.

In addition, if the number, n, of Gaussian components is stored in the model establishing unit, the receiving unit may be omitted.

The model establishing unit 603 further includes a parameter calculating unit 6031.

The parameter calculating unit 6031 is configured to calculate hybrid model parameters of the multidimensional Gaussian Mixture Model.

The multiple dimension hybrid model parameters include Gaussian distribution parameters corresponding to each Gaussian component and a weight of each Gaussian component in the multidimensional Gaussian Mixture Model.

The parameter calculating unit 6031 includes a probability calculating unit 10, a function constructing unit 20, and an estimating unit 30.

The probability calculating unit 10 is configured to calculate an occurring probability $s_i$ of each $S_i$ according to the M $S_i$ obtained through sampling.

The function constructing unit 20 is configured to construct a likelihood function including the multiple dimension hybrid model parameters.

The estimating unit 30 is configured to utilize the $s_i$ calculated by the probability calculating unit to calculate an estimated value of each multiple dimension hybrid model parameter when the likelihood function constructed by the function constructing unit achieves a maximum value.

The predicting unit 604 includes a probability density calculating unit 6041, a surviving probability calculating unit 6042, and lifetime calculating unit 6043.

The probability density calculating unit 6041 is configured to calculate an occurring probability density of a life cycle of the Peer.

The surviving probability calculating unit 6042 is configured to utilize the occurring probability density calculated by the probability density calculating unit 6041 to calculate a probability of a residual surviving predetermined variation lifetime of the peer.

The lifetime calculating unit 6043 is configured to utilize the probability calculated by the probability density calculating unit 6041 to obtain the residual online time of the peer.

The device further includes a life cycle predicting unit 605 configured to calculate a current surviving life cycle of the peer or a probability that a residual online time possibly occurs according to the residual online time predicted by the predicting unit 604 and an elapsed online time of the peer.

In an embodiment, the present invention further provides a model establishing device, which includes the obtaining unit 601, the receiving unit 602, and the model establishing unit 603. The model establishing unit 603 may be the parameter calculating unit 6031, and may include the function constructing unit and the estimating unit. The model establishing device may further include a sending unit.

The sending unit is configured to send description information of the Gaussian hybrid model established by the model establishing unit.

The so-called description information of the Gaussian hybrid model is the above hybrid model parameters, for example, w, p, and B.

To sum up, in the method and the device for predicting the residual online time of the peer in the P2P network according to the embodiments of the present invention, the history life cycle sampling data is utilized to establish the multidimensional Gaussian Mixture Model capable of representing the probability distribution of the residual online time of the peer. In the multidimensional Gaussian Mixture Model, the residual online time of the peer is not predicted based on a probability distribution followed by the residual online time of the peer under the influence of a single factor. But actually based on the residual online time of the peer influenced by various factors, through comprehensively considering the probability distributions respectively followed by the residual online time under the influences of various factors, the final multidimensional Gaussian Mixture Model is combined, and the residual online time of the peer is predicted according to such multidimensional Gaussian Mixture Model, so that the predicted result approaches the actual residual online time of the peer.

Through the descriptions of the preceding embodiments, those skilled in the art can understand that the present invention may be implemented by hardware only or by software and a necessary universal hardware platform. Based on such understandings, the technical solution of the present invention may be embodied in the form of a software product. The software product may be stored in a nonvolatile storage medium, which can be a Compact Disk Read-Only Memory (CD-ROM), a USB flash drive or a mobile hard disk. The software product includes a number of instructions that enable a computer device (personal computer, server, or network device) to execute the methods provided in the embodiments of the present invention.

What is claimed is:

1. A method for predicting a residual online time of a peer in a peer-to-peer (P2P) network, the method comprising:

obtaining, by a peer node in the P2P network, M history life cycle sampling data $S_i$ of the peer node, wherein i=1 to M and the history life cycle sampling data comprises a history starting online time point and a history online time of the peer node;

determining, by the peer node in the P2P network, Gaussian components n in a multidimensional Gaussian Mixture Model to be established, wherein n is a positive integer greater than or equal to 2, and the multidimensional Gaussian Mixture Model denotes a probability distribution of the residual online time of the peer node;

utilizing, by the peer node in the P2P network, $S_i$ and n to establish a multidimensional Gaussian Mixture Model; and predicting, by the peer node in the P2P network, the residual online time of the peer node by utilizing the multidimensional Gaussian Mixture Model.

2. The method according to claim 1, wherein contents of the history life cycle sampling data further comprise:

history online time information of the peer node, history starting online time point information of the peer node, and history online time interval information of the peer node.

3. The method according to claim 1, wherein the obtaining M history life cycle sampling data $S_i$ of the peer node comprises:

obtaining, by the peer node in the P2P network, M history life cycle source data $P_i$ of the peer, wherein i=1 to M; and sampling, by the peer node in the P2P network, the source data $P_i$ according to a sampling precision to obtain the history life cycle sampling data $S_i$.

4. The method according to claim 3, wherein the history life cycle sampling data or history life cycle source data are recorded and kept by the peer itself, or obtained concentratedly by enabling a peer node to send the history life cycle sampling data or history life cycle source data to a central server.

5. The method according to claim 1, wherein after the process of predicting the residual online time of the peer node, the method further comprises:

calculating, by the peer node in the P2P network, a current surviving life cycle of the peer or a probability that a residual online time possibly occurs according to the predicted residual online time and an elapsed online time of the peer node.

* * * * *